US010301514B2

(12) United States Patent
Khongal et al.

(10) Patent No.: US 10,301,514 B2
(45) Date of Patent: *May 28, 2019

(54) METHACRYLATE STRUCTURAL ADHESIVE FORMULATION AND PROCESS FOR THE USE THEREOF

(71) Applicant: Illinois Tool Works, Inc., Glenview, IL (US)

(72) Inventors: Ajay Khongal, Andhra Pradesh (IN); Nagesh Chitnavis, Andhra Pradesh (IN); Don Gosiewski, Peabody, MA (US); Subodh Deshpande, Andhra Pradesh (IN); Peter Carbutt, Groton, MA (US)

(73) Assignee: Illinois Tool Works Inc., Glenview, IL (US)

( * ) Notice: Subject to any disclaimer, the term of this patent is extended or adjusted under 35 U.S.C. 154(b) by 334 days.

This patent is subject to a terminal disclaimer.

(21) Appl. No.: 14/751,905

(22) Filed: Jun. 26, 2015

(65) Prior Publication Data

US 2015/0376473 A1 Dec. 31, 2015

Related U.S. Application Data

(60) Provisional application No. 62/017,881, filed on Jun. 27, 2014, provisional application No. 62/076,995, filed on Nov. 7, 2014.

(51) Int. Cl.
| | |
|---|---|
| *B63H 1/26* | (2006.01) |
| *C08G 61/04* | (2006.01) |
| *C09J 133/10* | (2006.01) |
| *F01D 5/14* | (2006.01) |
| *C09J 4/00* | (2006.01) |
| *C09J 133/06* | (2006.01) |

(52) U.S. Cl.
CPC ............... *C09J 133/10* (2013.01); *C09J 4/00* (2013.01); *C09J 133/06* (2013.01); *F01D 5/147* (2013.01)

(58) Field of Classification Search
CPC .......... C09J 133/10; C09J 4/00; C09J 133/06; F01D 5/147; C08F 220/18
USPC ................ 524/521, 515, 502, 500, 1; 520/1; 416/241, 223
See application file for complete search history.

(56) References Cited

U.S. PATENT DOCUMENTS

| | | | |
|---|---|---|---|
| 3,031,106 A | 4/1962 | Hooker | |
| 3,208,094 A | 9/1965 | Pilkington | |
| 4,055,384 A | 10/1977 | Palzer | |
| 4,090,640 A | 5/1978 | Smith et al. | |
| 4,629,094 A | 12/1986 | Vogel et al. | |
| 4,651,897 A | 3/1987 | Johnson | |
| 4,790,456 A | 12/1988 | Nakane et al. | |
| 5,257,723 A | 11/1993 | Bagung | |
| 5,264,525 A * | 11/1993 | Lees .................. | C08L 63/00 252/182.15 |
| 5,358,347 A | 10/1994 | Morris | |
| 5,366,309 A | 11/1994 | Springall | |
| 5,388,728 A | 2/1995 | Gueret | |
| 6,102,615 A | 8/2000 | Wilson, Sr. | |
| 6,183,156 B1 | 2/2001 | Morris | |
| 6,730,411 B1 | 5/2004 | Doe et al. | |
| 6,962,455 B2 | 11/2005 | Kugler et al. | |
| 2006/0011293 A1* | 1/2006 | Xia ..................... | C09D 5/08 156/307.1 |
| 2006/0205850 A1* | 9/2006 | Wang ................. | C08F 255/023 524/386 |
| 2013/0101339 A1 | 4/2013 | Gaardsoe et al. | |
| 2014/0216656 A1* | 8/2014 | Koshti ................ | C09J 4/06 156/332 |
| 2014/0231009 A1* | 8/2014 | Chitnavis .......... | C08F 220/18 156/332 |

FOREIGN PATENT DOCUMENTS

| | | |
|---|---|---|
| CN | 101155889 A | 4/2008 |
| CN | 101348536 A | 1/2009 |
| WO | 2006098967 A1 | 9/2006 |
| WO | 2014124074 A1 | 8/2014 |
| WO | 2014130270 A1 | 8/2014 |

* cited by examiner

*Primary Examiner* — Jessica Whiteley
(74) *Attorney, Agent, or Firm* — Avery N. Goldsten; Blue Filament Law PLLC

(57) ABSTRACT

A two part adhesive formulation is provided that has an adhesive part including methylmethacrylate monomer, an antioxidant, a cure inhibitor, and a polyfunctional monomer amount of dimethacrylate monomer, trimethacrylate monomer, or a combination thereof. An activator part includes methylmethacrylate monomer, and a cure accelerator. A toughening agent and an impact modifier in at least one of the adhesive part or the activator part. The adhesive formulation is well suited for forming a wind turbine blade from two or more substrates.

12 Claims, No Drawings

METHACRYLATE STRUCTURAL ADHESIVE FORMULATION AND PROCESS FOR THE USE THEREOF

RELATED APPLICATIONS

This application claims priority benefit of U.S. Provisional Application Ser. No. 62/017,881 filed Jun. 27, 2014; and U.S. Provisional Application Ser. No. 62/076,995 filed Nov. 7, 2014; the contents of which are hereby incorporated by reference.

FIELD OF THE INVENTION

The present invention in general relates to adhesives, and in particular to methacrylate adhesives with properties particularly well-suited for structural bonding in environments such as wind turbine blades.

BACKGROUND OF THE INVENTION

Conventional adhesives for wind turbine applications include vinyl ester-, epoxy-, and polyurethane-resin based adhesives. These adhesives tend to suffer a variety of limitations that include high internal stresses, bubble formation as a result of air entrapment, requirements of high temperature and lengthy post curing, and poor adhesive bonds in thicker application. Epoxy adhesives in particular have built-in stresses that tend to lead to cracking, yet remain widely used in these applications. Furthermore, epoxy adhesives do not have balanced physical property profiles over wide temperature ranges leading to temperature change induced failure modes.

To-date, DNV GL, the leading certification body for wind turbines has not approved any methyl methacrylate (MMA) based adhesives for wind turbine assembly. Compared to these conventional wind turbine adhesives, MMA has several attractive properties. For example, inherent stresses are high in epoxy-based adhesives, as compared to MMA based structural adhesive. The inherent stress of epoxy-based adhesives is manifest as a cracking phenomenon that is much more pronounced in these systems as compared to MMA under the same operating conditions. Furthermore, epoxy-based adhesives do not have balanced physical property profiles over wide temperature ranges and show poor operating performance in subfreezing temperatures.

Wind turbines are routinely exposed to physically demanding conditions, and are routinely positioned in remote terrestrial and aquatic settings. Due to the limitations of existing adhesives, additional monitoring and service are required to prevent catastrophic failure of the existing adhesives.

Thus, there exists a need for a MMA-based structural adhesive to bond wind turbines and in particular wind turbine blades. There also exists a need for such a formulation that has superior thermal stability to promote formulation storage prior to usage.

SUMMARY OF THE INVENTION

A two part adhesive formulation is provided that has an adhesive part including methylmethacrylate monomer, an antioxidant, a cure inhibitor, and a polyfunctional monomer amount of dimethacrylate monomer, trimethacrylate monomer, or a combination thereof. An activator part includes methylmethacrylate monomer, and a cure accelerator. A toughening agent and an impact modifier in at least one of the adhesive part or the activator part. The adhesive formulation is well suited for forming a wind turbine blade from two or more substrates.

DETAILED DESCRIPTION OF THE INVENTION

The present invention has utility as a MMA-based adhesive particularly well-suited for bonding of wind turbine components and in particular wind turbine blades. An inventive MMA-based adhesive has modified physical and mechanical properties, especially lap shear strength, coefficient of thermal expansion and reduced shrinkage to not only have more stable physical properties over a wide temperature range seen by a wind turbine of −40 to 40° C., along with resistance to cracking from thermal shock that is common in conventional epoxy-based adhesives. While the present invention is detailed hereafter with respect to bond of wind turbine blades, it is appreciated that an inventive structural methacrylate adhesives is suitable to bond substrates in a variety of different industries. Substrates readily bonded with an inventive adhesive illustratively automotive trim, building windows, side wall panels, roofs, and instances other where long term durability bonding of FRP is required.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

An inventive formulation provided as a two-part formulation includes an adhesive part that is synonymously referred to as Part A, or an adhesive Part A. The adhesive part of inventive formulation as a two-part formulation in prototypical form includes all the components active in the polymerization reaction except that of a cure activator. The activator is predominantly in an activator part that is synonymously referred to as Part B or an activator Part B. The following components of an inventive formulation are detailed as weight percentages of a formulated Part A or Part B inclusive of all components except diluents that are non-reactive under free radical cure conditions.

The inventive formulation in certain embodiments is provided in a user friendly mix ratio of Adhesive Part A to Activator Part B of 1:1. Development of strength and fixture time of a cured inventive adhesive on high strength fiber reinforced composite (FRP) is found to perform better than conventional adhesives. It has also been surprisingly discovered that inclusion of toughening agent and MMA monomer in both parts leads to superior performance adhesives under certain mixing conditions with FRP substrates.

Monomers suitable for the formation of an inventive MMA-based adhesive illustratively include methylmethacrylate, $C_2$-$C_{16}$ alkyl methacrylate, $C_1$-$C_{16}$ hydroxyl alkylacrylates. Specific methacrylate monomers operative herein in addition to aforementioned methylmethacrylate include ethylmethacrylate, isobornyl methacrylate, butyl methacrylate, ethyl hexyl methacrylates, dodecyl methacrylate, tetrahydrofurfuryl methacrylate, cyclohexyl methacrylate, 2-hydroxyl ethylacrylate, 2-hydroxyl methacrylate, 3-hydroxyl propylacrylate, 1-hydroxyl-2 amino propyl methacrylate, 1-amino-2-hydroxyl propyl methacrylate, 1-amino-3-hydroxy propyl methacrylate, 2-terbutyl amino ethyl methacrylate, or glycidyl methacrylate. Typically, methacrylate monomers are present from 35 to 75 total weight percent of an inventive formulation upon combination of Part A and Part B. In still other embodiments the monomer is present from 45 to 65 total weight percent of the inventive formulation upon combination of Part A and Part B.

An inventive formulation also includes in certain embodiments a di-methacrylate monomer, a tri-methacrylate monomer, or a combination thereof. These monomers are synonymously referred to herein as polyfunctional monomers and illustratively a di- or tri-(meth)acrylate monomers, such as those selected from polyethylene glycol di(meth)acrylates, bisphenol-A di(meth)acrylates, tetrahydrofurane di(meth)acrylates, hexanediol di(meth)acrylates, polythylene glycol di(meth)acrylates, such as triethylene glycol di(meth)acrylate, tripropylene glycol di(meth)acrylate, tetraethylene glycol di(meth)acrylate, diethylene glycol di(meth)acrylate, 1,4-butanediol di(meth)acrylate, 1,6-hexanediol di(meth)acrylate, pentaerythritol tetra(meth)acrylate, trimethylol propane tri(meth)acrylate, trimethylol propane tri(meth)acrylate, di-pentaerythritol monohydroxypenta(meth) acrylate, pentaerythritol tri(meth)acrylate, ethoxylated bisphenol-A di(meth)acrylate, ethoxylated trimethylolpropane tri(meth)acrylates, trimethylolpropane propoxylate tri(meth)acrylates, tris(2-hydroxy ethyl)isocyanurate triacrylate, methyl methacrylic acid, triethyleneglycoldimethacrylate (TEGMA), ethoxylated bisphenol A dimethacrylate, methoxy polyethylene glycol monomethacrylate or combinations thereof. The present invention containing polyfunctional monomers, the polyfunctional monomer is typically present on a mole ratio relative to the aforementioned methacrylate monomers of 0.001-0.5:1 with the ratio modifying the average chain length between cross linkages.

Versatile performance properties have been achieved with inventive adhesive formulations. In additional to conventional MMA monomer in an inventive formulation, a thermoplastic is provided. The inclusion of thermoplastics that are soluble or suspendable in MMA monomer upon adhesive cure act as toughening agents that provide properties to inventive formulations that are not observed in conventional formulations and generally improve adhesion to substrates being bonded. Thermoplastics operative herein as toughening agents illustratively include, styrene acrylonitrile copolymer (SAN), chlorosulphonated polyethylene, neoprene, a copolymer of ethylene acrylic elastomer, acrylonitrile styrene acrylate, poly(methyl methacrylate)-grafted-rubber, and combinations thereof. Typically, toughening agents are present from 10 to 40 total weight percent of an inventive formulation upon combination of Part A and Part B. In still other embodiments the toughening agent is present from 20 to 30 total weight percent of the inventive formulation upon combination of Part A and Part B. In certain inventive embodiments, the toughening agent is present in both Parts A and B. It is appreciated that styrene acrylonitrile copolymer when present as a toughening agent tends to increase the thermal stability over the temperature range to which wind turbines are subjected, compared to inventive formulations lacking the styrene acrylonitrile copolymer.

An impact modifier is also present in an inventive formulation. Without intending to be bound to a particular theory, when a toughening agent is blended with impact modifier, an increase in the strength of the adhesive under physical stress conditions is observed as compared to formulations devoid of the impact modifier. Impact modifiers operative herein illustratively include styrene butadiene copolymers, rubbers, and polycarbonates. Specific impact modifiers operative herein include methyl methacrylate butadiene styrene copolymers (MBS), nitrile rubber, blocked copolymers of styrene butadiene, buna rubbers, acrylonotrile butadiene styrene, and combinations thereof. Typically, impact modifiers are present from 2.5 to 25 total weight percent of an inventive formulation upon combination of Part A and Part B. In still other embodiments the impact modifier is present from 10 to 20 total weight percent of the inventive formulation upon combination of Part A and Part B. In certain inventive embodiments, the impact modifier is present in both Parts A and B.

In particular inventive embodiments including SAN copolymers toughening agent is present, a cured adhesive when placed under stressed, crazes to increase the strength of the adhesive, while affording the additional advantage of imparting solvent and heat resistance the adhesive formulation. Low temperature flexibility and FRP substrate adhesion are also noted to be improved with the inclusion of SAN copolymers. Incorporation of SAN reduces volatility and increases glass transition temp, Tg without increasing brittleness to an extent that there is a need for use of a flexibilizer to avoid the microcracks when the cured adhesive containing SAN copolymers is subjected to thermal cycle for thermal shock resistance. Incorporation of SAN copolymer enhances load bearing capability of cured adhesive, as well as lower density, and higher strength and modulus of elasticity, relative to inventive formulations devoid of SAN copolymers.

Additionally, in certain inventive embodiments that contain SAN-MMA blends as a toughening agent-impact modifier pairing, a synergistic reduction in shrinkage upon full cure is noted thereby inhibiting micro cracks. Incorporation of SAN copolymer enhances load bearing capability of cured adhesive. Impact resistance does not fall off rapidly at lower temperatures.

An etching agent is also present in certain an inventive formulations to improve surface adhesion between an adhesive formed from an inventive formulation and a substrate, such as a composite polymeric surface of a wind turbine blade. Etching agents operative herein include inorganic acids such as sulfuric acid, nitric acid, hydrofluoric acid, hydrochloric acid, and phosphoric acid; organic acids such as itaconic acid, maleic acid, methacrylic acid, halogenated acetic acids; and combinations thereof. It is appreciated that certain acid mixtures such as Pirhanna provide synergistic etching effects between the component acids to achieve rapid etching. Typically, etching agents are present from 0.1 to 1 total weight percent of an inventive formulation upon combination of Part A and Part B.

An antioxidant is also present in an inventive formulation to improve surface weathering properties of an adhesive formed from an inventive formulation in an environment such as that of a wind turbine blade. An antioxidant operative herein illustratively includes ditridecyl 3,3'-thiodipropionate (DTDTDP), dilauryl thiodipropionate (DLTDP), distearyl thiodipropionate (DSTDP), 3,5-Bis(1,1-dimethylethyl)-4-hydroxybenzenepropanoic acid octadecyl ester (1076), tris(2,4-di-tert-butylphenyl) phosphite, butylated hydroxyl toluene, and combinations thereof. Typically, an antioxidant is present from 0.25 to 1 total weight percent of an inventive formulation upon combination of Part A and Part B. In still other embodiments the antioxidant is present from 0.5 to 1.0 total weight percent of the inventive formulation upon combination of Part A and Part B. It is appreciated that an antioxidant is readily provided in both Parts A and B of an inventive formulation. Without intending to be bound to a particular theory, it is believed that the inclusion of an antioxidant promotes storage stability of a Part A or Part B in which it is present.

A cure inhibitor is also present in an inventive formulation to improve surface weathering properties of an adhesive formed from an inventive formulation in an environment such as that of a wind turbine blade. A cure inhibitor operative herein illustratively includes benzoquinone, naphthoquinone, hydroquinone, 4-hydroxy 2,2,6,6-tetramethyl-piperidine 1-oxyl (TEMPOL), halogenated tallow alkyl amines, aziridine, polyaziridines, dihydrocarbyl hydroxyl amine, 2,2,6,6-tetra-methyl-piperidimyloxyl (TEMPO); 2,2,5,5-tetra-methyl-pyrolyloxy (PROXYL) or a combination thereof that operate synergistically to provide storage stability to an inventive formulation. Typically, a cure inhibitor is present from 0.02 to 0.2 total weight percent of an inventive formulation upon combination of Part A and Part B. In still other embodiments the cure inhibitor is present from 0.1 to 0.2 total weight percent of the inventive formulation upon combination of Part A and Part B. It is appreciated that a cure inhibitor is readily provided in both Parts A and B of an inventive formulation to promote storage stability and limit premature curing prior at application to a substrate.

A cure initiator is also present in an inventive formulation to induce curing of the formulation monomer. Cure of the monomers in contact with at least one substrate allows the formulation to function as an adhesive. Initiators operative herein illustratively include tert-Butyl peroxylbenzoate, cumene hydroperoxide and tert-butyl hydroperoxide, potassium dihydrogen phosphate, borane complexes such as triethylamineborane-1,3-diaminopropane (TEB-DAP), and combinations thereof. It is appreciated that through selection of a suitable cure initiator, cure proceeds at ambient temperatures. Post cure treatment is optional, but generally considered to be unnecessary for an inventive adhesive to achieve full cure strength. This attribute is of considerable value in the assembly of wind turbine blades. Typically, cure initiators are present from 0 to 2 total weight percent of an inventive formulation upon combination of Part A and Part B. In still other embodiments the cure initiator is present from 0.2 to 1.0 total weight percent of the inventive formulation upon combination of Part A and Part B. In certain inventive embodiments, the cure initiator is present in both Parts A and B; however, storage stability is generally enhanced by separation of the cure initiator in Part A and separate from any cure accelerators in the inventive formulation, that is commonly in Part B.

A cure accelerator is also present in an inventive formulation for kinetically speed curing of the formulation monomer compared to inventive formulations devoid of a cure accelerator. Cure of the monomers in contact with at least one substrate allows the formulation to function as an adhesive. Accelerators operative herein illustratively include a pyridine derivative, a butaraldehyde aniline condensate, N,N-dimethylaniline, N,N-dimethyltoludiene, N,N-diethyltoludiene, metal acetyl acetonate, and combinations thereof. Typically, cure accelerators are present from 0.5 to 2.5 total weight percent of an inventive formulation upon combination of Part A and Part B. In certain inventive embodiments, the cure accelerator is present in both Parts A and B; however, storage stability is generally enhanced by segregation of the cure accelerator in Part B and separate from any cure initiators in the inventive formulation, that are commonly in Part A.

An adhesion promoter is also present in certain inventive formulations to achieve improved surface bonding of inventive adhesive compared to formulations lacking the same by modifying the hydrophobicity of the substrate surface. Adhesion promoters operative herein illustratively include phosphate esters; phosphate ester polymers; mixtures of mono- and di-functional phosphates; functionalized methacrylates such as hydroxyethylmethacrylate succinate, acetoacetoxy ethyl methacrylate, N,N-diethylaminoethyl methacrylate, ethoxylated bisphenol A dimethacrylate and methacrylate silanes and combinations thereof. In still other embodiments, a silanizing agent modifies the substrate surface to achieve improved surface bonding of inventive adhesive compared to formulations lacking the same by modifying the hydrophobicity of the substrate surface. Typically, adhesion promoters are present from 0 to 2.5 total weight percent of an inventive formulation upon combination of Part A and Part B. In still other embodiments the adhesion promoter is present from 0.2 to 2.0 total weight percent of the inventive formulation upon combination of Part A and Part B.

A wax is also present in certain inventive formulations to modify the viscosity and the set-time of inventive adhesive compared to formulations lacking the same. Waxes operative herein illustratively include n-olefins, naturally occurring waxes, paraffins, and combinations thereof. Typically, a wax is present from 0 to 2 total weight percent of an inventive formulation upon combination of Part A and Part B. In still other embodiments the adhesion promoter is present from 0.5 to 2.0 total weight percent of the inventive formulation upon combination of Part A and Part B. A wax is readily added to either Part A or Part B, or both.

It is appreciated that in addition to the afore-mentioned components, an inventive formulation is readily modified to include other additives to modify the properties of the Part A, Part B during storage, or the resulting cured adhesive. These additives illustratively include a thixotropic agent, a chelating agent, a pigment, a plasticizer, a filler, a chain terminating agent, a corrosion inhibitor, a fragrance, a fire retardant, and combinations thereof. Such additives are limited only by the requirement of compatibility with the other components of an inventive formulation. Such additives are provided to balance or otherwise modify at least one property of an inventive formulation as to handling, storage, cure rate, or adhesive properties. Typically, an additive of a filler is present from 0 to 20 total weight percent of an inventive formulation upon combination of Part A and Part B. Typically, the other aforementioned additives are each independently present from 0 to 5 total weight percent of an inventive formulation upon combination of Part A and Part B.

An inventive formulation in certain embodiments includes a diluent that is otherwise unreactive and serves to modify the volume of the formulation. A diluent is defined herein as a miscible and non-reactive compound relative to the components of the part in which the diluent resides. In particular, formulation diluents are, for example, inert fillers to adjust the weight ratios between a Part A and Part B that facilitate ease of mixing at the situs of formulation application to a substrate. It is appreciated that the industry finds weight ratios between Part A:Part B of 1:1 and 10:1 to be standard and thereby affording superior ease of use. Such diluents operative herein illustratively include tributyl citrate, trioctyl trimelliate, octyl stearate, n-butyl stearate, triphenyl phosphate, dactyl maleate, diethyl maleate, dimethyl maleate, dicotyl adipate, di iso decyl adipate, dimethyl adipate, water, dodecyl adipate, ethylene glycol, or miscible combinations thereof. Typically, a diluent is present from 0 to 5% total weight percent of an inventive formulation upon combination of Part A and Part B.

Formulation according to the present invention is a two-part adhesive as summarized below in Table 1. Two-part inventive formulation where amounts of ingredients are provided in weight percent and weight percent for each part.

TABLE 1

An Inventive 2-Part Formulation for Components in 1:1 wt ratio between Part A and Part B.

| Component: | Weight Percent |
|---|---|
| ADHESIVE (Part-A) | |
| Methacrylate ester Monomer | 30-70% |
| Cross linker | 0.5-10% |
| Antioxidant | 0.5-2% |
| Inhibitor | 0.02-0.3% |
| Etching agent | 0-2% |
| Toughening agent | 10-40% |
| Impact Modifiers | 3-30% |
| Initiator | 0-4% |
| Adhesion promoter | 0-5% |
| Wax | 0-2% |
| Diluents/other additives | 0-remainder |
| ACTIVATOR (Part B) | |
| Methacrylate ester Monomer | 40-80% |
| Accelerator | 1-5% |
| Inhibitor | 0.02-0.2% |
| Impact Modifiers | 2-20% |
| Toughening agent | 10-40% |
| Thixotropic agent | 0-5% |
| Wax | 0-2% |
| Diluents/other additives | 0-remainder |

Based on the above description, it would be appreciated that an inventive two component adhesive readily formed free of VOCs and solvents. Additionally, the rheological properties of the Parts A and B are readily adjusted for a range of viscosities to serve a desired application. Further, with inclusion of etching agents and/or adhesion promoters, an inventive adhesive is readily applied as co-mixed Parts A and B without resort to prior application of a primer to the substrate, sanding, or otherwise roughening the substrate surface.

Regardless of the form of an inventive formulation, upon induction of pot life for the formulation, the formulation is present in simultaneous contact with two or more substrates for an amount of time sufficient to achieve a bond between the substrates. Two such substrates can be brought together to form various jointed structures such as a lap joint, butt joint, corner joint, edge joint, and T-joint. In still other embodiments, an inventive formulation is applied to a single substrate and allowed to cure to form a coating that affords substrate protection or is operative as a primer for subsequent material applications. As inventive formulations typically achieve a rapid build in strength per ASTM D 1002, substrates are fixtured or otherwise held in relative desired alignment for a time period of from 5 minutes to 120 minutes. The joined substrates are then amenable to being removed from the fixture while an inventive formulation continues to cure to achieve terminal strength. As an inventive formulation cures through a free radical mechanism, an inventive formulation can be applied to a variety of thicknesses and still achieve cure polymerization. Typical thicknesses of an inventive formulation between substrates ranges from 0.001-4 mm.

The present invention is further described with respect to the following non-limiting examples. These examples are intended to illustrate specific formulations according to the present invention and should not be construed as a limitation as to the scope of the present invention.

Example 1. Compounding of Two-Part Inventive Formulation

An adhesive Part A is produced by mixing together in a mixing kettle equipped with mechanical stirrer and nitrogen gas blanketing: methacrylate ester monomer, cross linkers, antioxidant and inhibitor. All the ingredients are blended by swirling the mixture for approx. 10-15 minutes at room temp. Etching agents/Adhesion promoters, chelating agents and wax are added in the above mix and were stirred for 15 minutes at 500 rpm. After 15 minutes, a desired amount of toughening agent is added to the mixture and stirred for another 30 minutes to form a homogeneous mass. Further agitator speed is raised to 800 rpm to ensure uniform mixing of all the ingredients. Impact modifiers are added over a period of 5-10 minutes under vigorous stirring. Stirring this then stopped and the mixture is allowed to swell for 2 hours. After 2 hours, the mass is stirred for 30 minutes at 1000 rpm until the mass becomes a smooth paste. The stirring speed is then reduced to 200 rpm and the cure initiator is added to the reaction mass. The reactor is then evacuated for 20 minutes under vacuum of 600 mm Hg to remove entrapped gas bubbles. The material is then packed under a nitrogen atmosphere as a Part A of an inventive formulation. An activator Part B is produced by mixing together in a mixing kettle equipped with mechanical stirrer and nitrogen gas blanketing: methacrylate ester monomer, antioxidant and inhibitor. All the ingredients are blended by swirling the mixture for approx. 10-15 minutes at room temp. Accelerators, chain terminating agent and wax are added in the above mix and are stirred for 15 minutes at 500 rpm. After 15 minutes, desired amount of toughening agent is added very slowly to the monomer mixture and is stirred for another 30 minutes till it forms homogeneous mass. Further agitator speed is raised to 800 rpm to ensure uniform mixing of all the ingredients. Impact Modifiers are added slowly over the period of 5-10 minutes under vigorous stirring. Stopped the agitator and soaked the mass for 2 hours. After 2 hours, stirred the mass for 30 minutes at 1000 rpm till mass becomes smooth paste. Reduce the speed to 200 rpm and initiator is added very slowly to the reaction mass. The reactor is evacuated for 20 minutes under vacuum 600 mm Hg to remove entrapped bubbles and packed in nitrogen atmosphere.

Example 2. Development of Strength

Duplicate lap joints are formed between strips of fiber glass reinforced plastic (FRP) with the substrate strips having a thickness of 3.0 mm and an adhesive thickness of between 0.3 mm and 0.6 mm at a temperature of 23.5° C. No prior surface preparation is performed. The coupon dimensions are 101.6 mm×25.4 mm×3.35 mm with an overlap of 25.4 mm×12.5 mm with a ramp rate of 10 mm per minute. The strips are coated with formulations of Example 1. The rapid strength development of invented composition allows for short cycle times at assembly line, thus increases the efficiency of adhesion. The results are summarized in Table 2.

TABLE 2

Summary of lap shear strength of FRP substrates and failure mode as a function of time after application, where CF denotes cohesive failure.

| Time | Lap shear strength in Mpa | Failure mode |
|---|---|---|
| 1 Hr. | 12.3 | 100% CF |
| 2 Hrs. | 15.5 | 100% CF |
| 3 Hrs. | 16.3 | 100% CF |
| 4 Hrs. | 16.5 | 100% CF |
| 5 Hrs. | 18.6 | 100% CF |
| 6 Hrs. | 18.7 | 100% CF |
| 24 Hrs | 19.8 | 100% CF |
| 7 Days | 21.4 | 100% CF |

Example 3. Properties of Inventive Adhesive

In Table 3, the properties of an inventive adhesive per Example 1 are compared with DNV GL specifications for wind turbine adhesives, along with comparison to conventional epoxy and polyurethane (PU) adhesives conventional to this application. Stability under load is noted to be excellent for the inventive adhesive with limited loads thus enhancing the creep and fatigue properties.

TABLE 3

Comparative data properties of inventive adhesive with specifications and Comparative Examples A-C.

| Description | GL/LM Spec. | Comparative Example A (Epoxy) | Comparative Example B (Epoxy) | Comparative Example C (PU) | Inventive adhesive of Example 1 |
|---|---|---|---|---|---|
| Mix Ratio | NA | 100:45 | 100:42 | 100:33 | 1:1 |
| Appearance | | | | | |
| Adhesive | NA | Yellow | Green | Lt Green | Off White |
| Activator | | Red | | Brown | Pale Yellowish |
| Brookfield Viscosity | | | | | |
| Adhesive | NA | — | — | — | 75,000-85,000 |
| Activator | | | | | 1,05,000-1,25,000 |
| Pot life in min/Working time - Quantitatively | NA | 30 | 240-280 | 70-100 | 35-40 |
| LSS on IIC HSFRP - Mpa (0.5 mm bond gap) at 23° C. | >12 | 13-15; 100% CF | 20-25; 100% CF | 20; 100% CF | 18-22; 100% cohesive failure (CF) |
| LSS on IIC HSFRP - Mpa (3 mm bond gap) at 23° C. | >12 | — | — | — | 16-20; 100% CF |
| LSS on IIC HSFRP - Mpa (0.5 mm bond gap) at 50° C. | >12 | — | — | — | 16-20; 100% CF |
| LSS on IIC HSFRP - Mpa (3 mm bond gap) at 50° C. | >12 | — | — | — | 13-16; 100% CF |
| Peel - N/mm (Pli) | >2 | 1.5 | — | — | 5-6 |
| Glass Transition Temperature - after 24 hrs - DMA | >65° C. | 75-85° C. | 80° C. | 65° C. | 105-110° C. |
| Exotherm time - min. | NA | 80 min | — | — | 86 min |
| Exotherm Temp - ° C. | NA | 125° C. | — | — | 91° C. |
| Thermal Stability at 60° C. | — | — | — | — | Stable for 5 days |

Note:
Property values of comparative Examples A-C are from commercial data sheet values.

During an accelerated shelf life study, it is established that the inventive formulation of Example 1 is stable for 22 days at 50° C. and 5 days at 60° C. which is equivalent to 6 months shelf life at room temperature condition.

The invention claimed is:

1. A two part adhesive formulation comprising:
an adhesive part comprising:
methylmethacrylate monomer;
an antioxidant;
a cure inhibitor; and
a polyfunctional monomer made up of dimethacrylate monomer, trimethacrylate monomer, or a combination thereof; and
an activator part comprising:
methylmethacrylate monomer; and
a cure accelerator; and
a toughening agent present from 10 to 40 total weight percent in at least one of said adhesive part or said activator part, said toughening agent being styrene acrylonitrile copolymer (SAN) and optionally containing one or more of chlorosulphonated polyethylene, neoprene, a copolymer of ethylene acrylic elastomer, acrylonitrile styrene acrylate, poly(methyl methacrylate)-grafted-rubber, and combinations thereof;
an impact modifier in at least one of said adhesive part or said activator part; and
an antioxidant in at least one of said adhesive part or said activator part and present in an amount from 0.25 to 1 total weight percent and selected from the group consisting of: ditridecyl 3,3'-thiodipropionate (DTDTDP), dilauryl thiodipropionate (DLTDP), distearyl thiodipropionate (DSTDP), 3,5-Bis(1,1-dimethylethyl)-4-hydroxybenzenepropanoic acid octadecyl ester (1076), tris(2,4-di-tert-butylphenyl) phosphite, butylated hydroxyl toluene, and combinations thereof.

2. The formulation of claim 1 further comprising an etching agent present in at least one of said adhesive part or said activator part.

3. The formulation of claim 1 further comprising a wax present in at least one of said adhesive part or said activator part.

4. The formulation of claim 1 wherein said methylmethacrylate monomer amount constitutes the majority by weight of the total formulation.

5. The formulation of claim 1 wherein said polyfunctional monomer amount is present on a mole ratio relative to said methylmethacrylate monomer amount in a molar ratio of 0.001-0.5:1.

6. The formulation of claim 1 wherein said impact modifier is one of methyl methacrylate butadiene styrene copolymers (MBS), rubbers, polycarbonates, or combinations thereof.

7. The formulation of claim 1 further comprising an etching agent present in said adhesive part.

8. The formulation of claim 1 wherein said toughening agent and said impact modifier are both present in both said adhesive part and said activator part.

9. The formulation of claim 1 further comprising at least one of thixotropic agent, a chelating agent, a pigment, a plasticizer, a filler, a chain terminating agent, a corrosion inhibitor, a fragrance, a fire retardant, and combinations thereof.

10. The formulation of claim 1 wherein said adhesive part and said activator part are present in a 1:1 weight ratio.

11. The formulation of claim 1 wherein said toughening agent is styrene acrylonitrile copolymer and said impact modifier is methyl methacrylate butadiene styrene copolymers.

12. A wind turbine blade comprising:
a cured formulation of claim 1; and
said cured formulation in simultaneous contact between a first substrate and a second substrate of a turbine blade.

* * * * *